H. R. SUMMERHAYES.
ELECTRICITY TRANSFORMING AND CONVERTING APPARATUS.
APPLICATION FILED MAY 7, 1917. RENEWED FEB. 13, 1919.
1,301,334.                                  Patented Apr. 22, 1919.
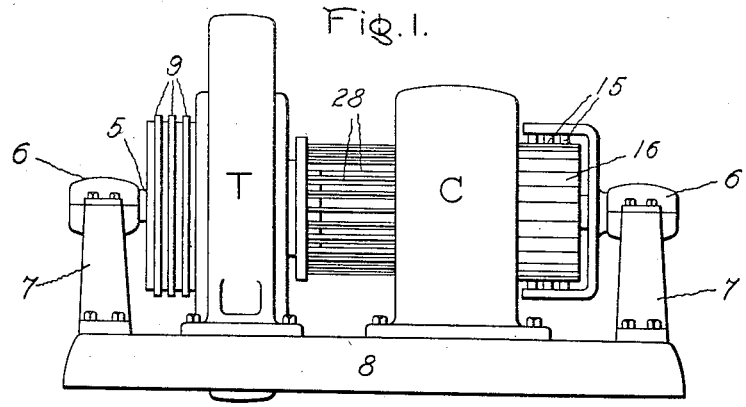
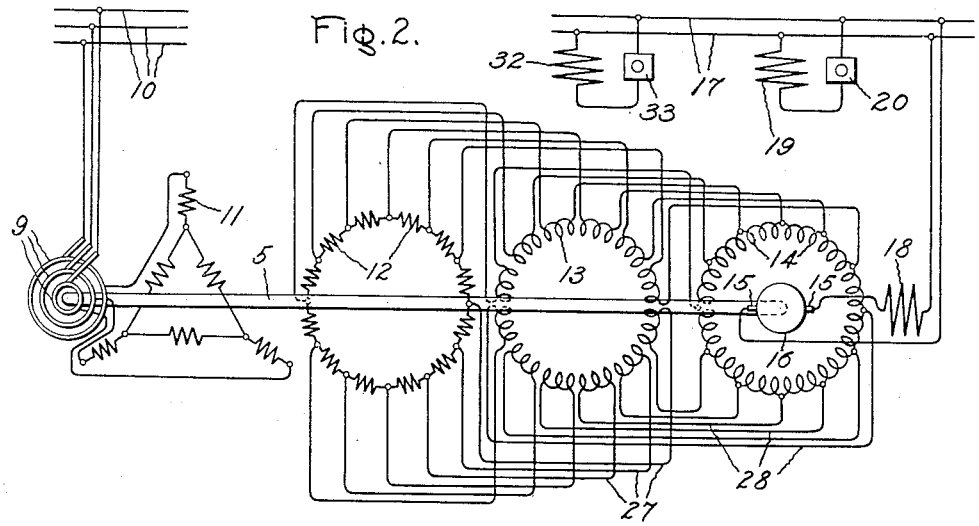
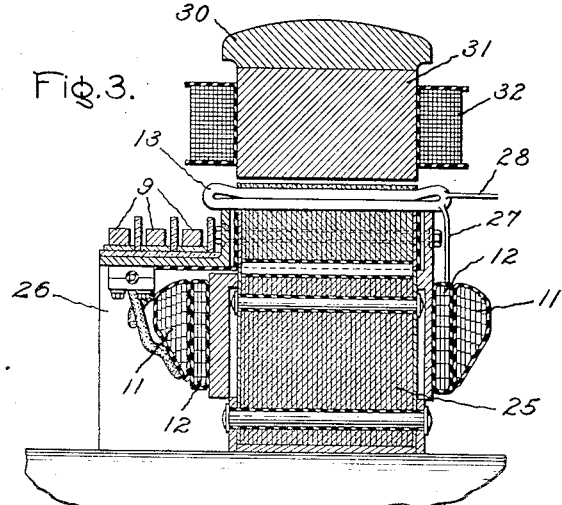
Inventor:
Henry R. Summerhayes,
by Albert G. Davis
His Attorney.

UNITED STATES PATENT OFFICE.

HENRY R. SUMMERHAYES, OF SCHENECTADY, NEW YORK, ASSIGNOR TO GENERAL ELECTRIC COMPANY, A CORPORATION OF NEW YORK.

ELECTRICITY TRANSFORMING AND CONVERTING APPARATUS.

1,301,334.      Specification of Letters Patent.      Patented Apr. 22, 1919.

Application filed May 7, 1917, Serial No. 166,854. Renewed February 13, 1919. Serial No. 276,863.

*To all whom it may concern:*

Be it known that I, HENRY R. SUMMERHAYES, a citizen of the United States, residing at Schenectady, in the county of Schenectady, State of New York, have invented certain new and useful Improvements in Electricity Transforming and Converting Apparatus, of which the following is a specification.

My invention relates to electricity transforming and converting apparatus. In their copending patent application Serial No. 118,635, filed September 6, 1916, Charles W. Stone and Henry M. Hobart describe the use of a stepdown polyphase transformer mounted on the rotatable shaft of a device for converting alternating current electric energy into electric energy of a different character, such for example as a synchronous converter or rectifier. My present invention relates particularly to electricity transforming and converting apparatus of this type, and has for its principal object the provision of an improved arrangement of an auxiliary dynamo-electric machine in combination with such a transformer and electricity converting device. More particularly, the object of my present invention is to provide an improved arrangement of rotatable transformer synchronous converter and booster.

The invention is particularly applicable to any rotating apparatus for receiving alternating current electric energy and delivering direct current electric energy, such as a synchronous converter or rectifier. In accordance with the aforementioned invention of Stone and Hobart, the step-down transformer of such an apparatus is mounted on the same shaft as the rotatable member of the converting device. The rotatable transformer is usually of cylindrical configuration, and I have discovered that its external cylindrical surface may be very advantageously employed to carry the winding of an auxiliary dynamo-electric machine, such, for example, as the armature winding of a synchronous booster. My present invention, therefore, consists in slotting the outer surface of the core of the rotatable transformer and assembling an armature winding in such slots. This armature winding is arranged to rotate within the influence of a stationary magnetic field system, and when acting as a booster for a converter may be connected between the secondary winding of the step-down transformer and the armature winding of the converter.

The novel features of the invention which I believe to be patentable are definitely set forth in the appended claims. The construction and mode of operation of an apparatus embodying the invention will be understood from the following description taken in conjunction with the accompanying drawings, in which:

Figure 1 is an elevation of an electricity transforming and converting apparatus embodying my present invention; Fig. 2 is a diagram of the electrical connections of the apparatus; and Fig. 3 is a sectional view of the combined rotatable transformer and dynamo-electric machine of my present invention.

The apparatus illustrated in the accompanying drawings comprises a synchronous converter C and a combined step-down transformer and booster T. The apparatus has a single rotatably mounted shaft 5. In the machine illustrated in the drawings, the shaft 5 is mounted in bearings 6 supported in posts 7 secured to a base 8. The magnetic core and windings of the transformer and booster as well as the rotor of the converter are carried by the shaft 5. Collector rings 9 are also carried by the shaft 5 and serve to electrically connect the three phase source of alternating current energy supply 10 to the primary winding 11 of the rotatable transformer. The primary winding 11, as illustrated in the drawings, has six coils which are star-connected with an internal delta, as will be best seen by reference to Fig. 2. The secondary winding of the step-down transformer is composed of 12 coils which are mesh-connected to form in effect a twelve phase winding, as shown in Fig. 2. The secondary winding 12 is electrically connected to the armature winding 13 of a synchronous booster. The winding 13 is carried in suitable slots on the outside of the transformer core, as will be more fully described hereinafter. The armature winding 13 of the booster is also electrically connected to the commutated armature winding 14 of the synchronous converter. Brushes 15 bear upon the commutator 16 of the armature winding 14 of the converter and are electrically connected to the D. C. mains 17. The stationary field magnet system of the converter comprises an interpole winding 18 electrically connected in series relation with the commutator brushes 15 and a main field winding 19 connected in shunt relation to the brushes 15. A rheostat 20 is preferably included in the main field winding circuit.

The rotatable transformer of the apparatus consists of a laminated magnetic core 25 secured to the shaft 5. This core is provided with suitable winding windows in which are assembled the coils of the primary winding 11 and of the secondary winding 12. The high tension slip rings 9 are carried by a bracket 26 bolted or otherwise suitably secured to the core 25. The mechanical and electrical construction of this rotatable transformer is described at length in the aforementioned patent application of Stone and Hobart, and for the exposition of my present invention need not be more fully described here.

The magnetic core 25 is generally of cylindrical configuration, and in accordance with my present invention, the outer surface of this core is slotted and the armature winding 13 of the synchronous booster is assembled in the slots. Connections 27 electrically connect the armature winding 13 to the secondary winding 12 of the step-down transformer, while connections 28 electrically connect the armature winding 13 to the armature winding 14 of the converter. It will be understood by those skilled in the art that the armature winding 13 of the booster is in effect connected in series relation between the secondary winding 12 of the transformer and the armature winding 14 of the converter, so that the voltage induced in the armature winding 13 acts to increase or boost the alternating current voltage which would otherwise be impressed on the armature winding 14 of the converter. In the accompanying drawings, the booster winding 13 is an open winding having twelve sections. One section of the booster winding is connected in series in each of the twelve connections between the secondary winding 12 of the transformer and the armature winding 14, of the converter. A stationary field magnet system surrounds the rotatable transformer core 25. This field magnet system comprises a stator frame 30 carrying poles 31 upon which are mounted the main field coils or spools 32. The field coils 32 are energized from the D. C. mains 17, and a rheostat 33 is included in the circuit thereof for regulating the field strength of the auxiliary dynamo-electric machine or booster. The windings of the synchronous booster may be so arranged and spaced with reference to the transformer windings that the same iron which carries the magnetic flux of the transformer may also carry part of the magnetic flux of the synchronous booster. In other words, the coils may be so arranged that the time phase of the two fluxes are somewhat different, so that there is a saving in the quantity of iron required compared to that which would be required to carry the two magnetic fluxes in independent iron circuits.

It will be evident to those skilled in the art that the rotatable armature winding 13 and stationary magnetic field coils 32 constitute a dynamo-electric machine which can be used for other purposes than a booster for a synchronous converter. For example, this auxiliary dynamo-electric machine may be used for improving the commutation of a converter or rectifier. Still other uses for this auxiliary dynamo-electric machine will suggest themselves to those skilled in the art.

The phase multiplication of the step-down transformer may be of any desired character, and I have merely illustrated a phase multiplication of 3 to 12 phases for explanatory purposes. It will, furthermore, be understood that the coils of the secondary winding of the transformer may be arranged in accordance with any suitable principle for obtaining the desired phase multiplication.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. An electricity transforming and converting apparatus comprising in combination a rotatable member, a stationary magnetic field system, an armature winding carried by said rotatable member and electrically associated with said magnetic field system to form a synchronous converter, a transformer having a substantially cylindrical magnetic core carried by said member, primary and secondary windings mounted on said core, a second stationary magnetic field system, an auxiliary armature winding carried by said core and arranged to rotate within the influence of said second magnetic field system, means electrically connecting said auxiliary armature winding to the secondary winding of the transformer and to the armature winding of the converter, and collector rings carried by said member and electrically connected to the primary winding of the transformer.

2. An electricity transforming and converting apparatus comprising in combination means including a rotatable shaft for receiving polyphase alternating current electric energy and delivering direct current electric energy, a transformer having a magnetic core mounted on said shaft, an auxiliary dynamo-electric machine having an armature winding carried by said core, and means electrically connecting said armature winding to said first mentioned means and to the secondary winding of said transformer.

3. An electricity transforming and converting apparatus comprising in combination a synchronous converter having a rotatable shaft, a transformer having a magnetic core mounted on said shaft, and a booster having an armature winding carried by said core and electrically connected to the armature winding of said converter and to the secondary winding of said transformer.

4. An electricity transforming and converting apparatus comprising in combination a rotatably mounted shaft, a transformer having a magnetic core and primary and secondary windings mounted on said shaft, a synchronous converter having a rotatable member carrying an armature winding mounted on said shaft, an auxiliary dynamo-electric machine having an armature winding carried by the magnetic core of said transformer, and means electrically connecting the armature winding of said auxiliary machine to the secondary winding of said transformer and to the armature winding of said converter.

5. An electricity transforming and converting apparatus comprising in combination a synchronous converter having a rotatable shaft, a transformer mounted on the shaft of said converter and electrically connected to supply polyphase alternating current to said converter, and a booster for said converter having its armature winding carried by the magnetic core of said transformer.

6. An electricity transforming and converting apparatus comprising in combination a synchronous converter having a rotatable shaft, a transformer mounted on the shaft of said converter and electrically connected to supply polyphase alternating current to said converter, and a booster for said converter having its armature winding carried by the magnetic core of said transformer, the windings of said transformer and booster being so arranged on the transformer core that the same iron which carries the mangetic flux of the transformer also carries part of the magnetic flux of the booster.

7. An electricity transforming and converting apparatus comprising in combination a synchronous booster having a rotatable shaft, a transformer having a magnetic core mounted on said shaft, and a booster having an armature winding carried by said core and electrically connected between the armature winding of said converter and the secondary winding of said transformer, the armature winding of said booster being so arranged with respect to the windings of said transformer that the same iron which carries the magnetic flux of the transformer also carries part of the magnetic flux of the booster, the transformer and booster windings being further so arranged that the transformer and booster fluxes carried by the same iron differ somewhat in time phase.

In witness whereof, I have hereunto set my hand this 4th day of May, 1917.

HENRY R. SUMMERHAYES.